(12) United States Patent
Hopman et al.

(10) Patent No.: US 8,499,642 B2
(45) Date of Patent: Aug. 6, 2013

(54) HERMETICALLY SEALED PRESSURE SENSING DEVICE

(75) Inventors: Wico Hopman, Enschede (NL); Robert Zwijze, Vriezenveen (NL); Paul Gennissen, Markelo (NL); Maarten van Noorden, Linde (NL); George van der Donk, Holten (NL); Jans Kruise, Borne (NL)

(73) Assignee: Sensata Technologies, Inc., Attleboro, MA (US)

( * ) Notice: Subject to any disclaimer, the term of this patent is extended or adjusted under 35 U.S.C. 154(b) by 161 days.

(21) Appl. No.: 13/097,246

(22) Filed: Apr. 29, 2011

(65) Prior Publication Data

US 2011/0296927 A1    Dec. 8, 2011

(30) Foreign Application Priority Data

Jun. 8, 2010  (EP) .................................... 10165275

(51) Int. Cl.
 *G01L 9/00*  (2006.01)
 *G01L 7/08*  (2006.01)
(52) U.S. Cl.
 USPC ................................. 73/723; 73/715; 73/717
(58) Field of Classification Search
 USPC .................................................. 73/700–756
 See application file for complete search history.

(56) References Cited

U.S. PATENT DOCUMENTS

| | | | |
|---|---|---|---|
| 5,665,921 A | 9/1997 | Gerst et al. | |
| 6,453,747 B1 * | 9/2002 | Weise et al. | 73/715 |
| 7,197,937 B2 * | 4/2007 | Amore et al. | 73/715 |
| 7,555,957 B2 * | 7/2009 | Toyoda | 73/715 |
| 2004/0007073 A1 * | 1/2004 | Weise | 73/715 |
| 2004/0007074 A1 * | 1/2004 | DiPaola et al. | 73/715 |
| 2004/0007075 A1 * | 1/2004 | Ishiguro et al. | 73/715 |
| 2005/0011273 A1 * | 1/2005 | Sasaki et al. | 73/756 |
| 2010/0281994 A1 * | 11/2010 | Brown et al. | 73/729.1 |

FOREIGN PATENT DOCUMENTS

| | | |
|---|---|---|
| DE | 4234289 C1 | 11/1993 |
| DE | 4407212 C1 | 8/1995 |

* cited by examiner

*Primary Examiner* — Andre Allen
(74) *Attorney, Agent, or Firm* — Chapin IP Law, LLC

(57) ABSTRACT

The invention relates to a fluid pressure sensing device comprising a pressure sensing transducer having a support structure and a diaphragm attached to said support structure, the diaphragm having a fluid facing side. A housing has a transducer receiving cavity defined by a bottom wall and a housing sidewall extending upwardly from the bottom wall. The bottom wall is formed with a fluid pressure receiving recess. A fluid pressure port is formed in the housing in communication with the recess. The diaphragm is positioned between the support structure and the fluid pressure receiving recess and a seal material around a support structure sidewall fixes the pressure sensing transducer in the housing and provides a hermetic seal.

15 Claims, 5 Drawing Sheets

HERMETICALLY SEALED PRESSURE SENSING DEVICE

TECHNICAL FIELD OF THE INVENTION

The invention relates generally to a pressure-sensing device, more particularly to a fluid pressure sensing device.

BACKGROUND OF THE INVENTION

A known pressure sensor as shown in U.S. Pat. No. 4,875,135, assigned to the assignee of the present invention, the subject matter of which is included herein by this reference, comprises a capacitive pressure sensing transducer having a thin ceramic diaphragm mounted in closely spaced, sealed, overlying relation to a ceramic base and having metal coatings deposited on respective opposing surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A connector body of electrical insulating material is fitted over the electrical circuit and is secured to a housing having a cavity in which the transducer is received. The housing is formed with a port for connection to a fluid pressure source to be monitored and a flexible O-ring seated in the metal housing around the port with the transducer biased against the O-ring to form a fluid seal and to define a fluid receiving recess with the diaphragm exposed to fluid in the recess. A fluid could be any substance in liquid or gas form. In that arrangement, the diaphragm is movable in response to variation in pressure applied to the diaphragm to vary the capacitance of the capacitor in accordance with the changes in applied pressure and the electrical circuit provides an electrical output signal corresponding to the applied pressure.

Although sensors of the type described have been very successful, there are certain fluids which are corrosive relative to elastomers used for the O-ring seals. Furthermore, the O-ring seal could be permeable with respect to fluids such as ethanol, methanol and fuels. By way of example, automotive fluids having certain additives are incompatible with typical elastomers. Examples of automotive fluids are ecological fuels like biodiesel and gasoline with ethanol or methanol added.

It is conventional to place a sensing element in a chamber and to seal the chamber with a flexible diaphragm with the chamber filled with relatively incompressible oil to serve as a pressure transfer fluid as shown in U.S. Pat. No. 7,231,830. This approach could be used in sensing a condition, such as pressure, of a fluid to be sensed, which fluid is corrosive to the sensing element. However, this represents a relatively expensive solution in manufacturing a suitable package requiring a number of processing steps including evacuation of a chamber and back filling with oil and providing a seal compatible with the pressure of the sensed fluids.

A known pressure sensor as shown in U.S. Pat. No. 6,272,927, assigned to the assignee of the present invention, the subject matter of which is included herein by this reference, comprises a metal housing having a fluid receiving port leading to a cavity in which a pressure sensing element is received has a flexible metal diaphragm extending over a portion of the cavity which includes the port. The metal diaphragm is hermetically attached to the housing as by welding or brazing. The pressure sensing element having, a ceramic pressure sensing diaphragm is placed in the cavity with the ceramic diaphragm disposed against the metal diaphragm but with a thin intermediate layer of plastic material, preferably somewhat resilient, such as elastomeric material, therebetween. The fluid pressure is transferred to the ceramic diaphragm through the flexible metal diaphragm and intermediate layer with the intermediate layer effectively mitigating hysteresis. However, this represents a relatively expensive solution in manufacturing a suitable package requiring a number of processing steps including welding or brazing the metal diaphragm to the port and positioning the intermediate layer between the metal diaphragm and ceramic pressure sensing diaphragm.

SUMMARY OF THE INVENTION

It is an object of the present invention to provide a fluid pressure sensor free of the above noted prior art limitations. Another object of the invention is to provide a fluid pressure sensor which has a hermetic fluid receiving chamber with a pressure transmitting surface for transferring pressure to the sensor which is accurate with little or no hysteresis and which is reliable, long lasting and/or robust to harsh pressure media such as (bio)fuels.

According to the invention, this object is achieved by device having the features of claim 1. Advantageous embodiments and further ways of carrying out the invention may be attained by the measures mentioned in the dependent claims.

According to the invention, the device comprises a pressure sensing transducer, a connector body and a housing. The pressure sensing transducer has a support structure and a diaphragm attached to said support structure, the diaphragm having a fluid facing side to be exposed to a fluid pressure. The connector body has connector terminals therein. The housing forms a chamber together with the connector body. An electrical circuit is disposed in the chamber and is electrically connected to the transducer and connector terminals for providing an electrical signal corresponding to the applied pressure at the diaphragm. The housing has a transducer receiving cavity defined by a bottom wall and a housing sidewall extending upwardly from the bottom wall. The bottom wall is formed with a fluid pressure receiving recess. A fluid pressure port is formed in the housing in communication with the recess. The diaphragm is positioned between the support structure and the fluid pressure receiving recess, and a seal around a support structure sidewall fixes the pressure sensing transducer in the housing and provides a hermetic seal.

These features enable one to manufacture a pressure sensing device with less components. Compared with the device shown in U.S. Pat. No. 6,272,927, no flexible metal diaphragm which is welded to the housing and intermediate layer of plastic material is needed. The sealing mechanism according to the present invention is based on the compression of glass and the ceramic sensing element in a metal port. In short, the combination of a housing or a support element and pressure sensing transducer is heated. The glass liquefies flows into an area between the support structure and the port or support element. The material of the port or support element is chosen such that the coefficient of temperature expansion (CTE) is larger than the CTE of the ceramic sensing element. Consequently, by cooling down, the material shrinks at a higher rate than the support structure and compresses the glass between the support structure and the housing/support element and forms an hermetic seal. Sealing at the support structure allows for complete decoupling of the sensing and sealing function, i.e. compression sealing of the support structure does not result in offset changes or drift over the lifetime of the pressure sensing device.

In an embodiment, seal material around the support structure of the pressure sensing transducer is radial compressed. In a further embodiment, the pressure sensing transducer has a neutral deflection plane and the seal material is radially compressed at height of the neutral deflection plane. This has the advantage, that the pressure sensing transducer is initially kept in place by the pressure forces in the seal material. Furthermore, the pressure increases the strength of the seal and prevents cracks from propagating through the seal making the glass less vulnerable to crack formation. A compressed seal could be obtained by choosing the materials of the housing, seal and support structure such that the coefficient of thermal expansion CTE of the housing is greater than the CTE of the sealing material and the CTE of the support structure. Furthermore, the forces acting at height of the neutral deflection plane will hardly result in deflection of the transducer and thus to a change, i.e. offset and/or gain, of electrical characteristics of the transducer which are representative for the pressure acting on the diaphragm. Changes in compression pressure in the seal material around the neutral deflection plane during the lifecycle of the pressure sensor due to the metastable state of the glass will not result in a noticeable bending of the transducer and thus a noticeable change in electrical characteristic of the pressure sensing device.

In an embodiment, the seal material fixes the pressure sensing transducer directly to the housing. This feature provides a robust hermetic fluid pressure sensing device which is relatively easy to manufacture.

In a further embodiment, a seal space is present between the sidewall and the support structure, the seal space comprising a buffer part configured for receiving seal material before sealing, a sealing part configured for providing the hermetic seal and an alignment part configured for aligning the pressure sensing transducer in the housing. These features are advantageous to manufacture pressure sensing devices efficiently and with a high yield. In a further embodiment, the diaphragm has a border side and the seal space further comprises an undercut part extending from the alignment part along the border side of the diaphragm to an annular platform of the housing on which the fluid facing side of the diaphragm is positioned. When the seal material has filled the undercut part, this material seals the bonding material which bonds the support structure and diaphragm together from the fluid. This enables to use a bonding material which is sensitive for the fluid to be sensed.

In an advantageous embodiment, the seal space has a first width in the buffer part, a second width in the sealing part and a third width in the alignment part, the first width≧the second width>the third width.

In a further embodiment, an annular recess of the support structure forms a part of the buffer part. This feature provides a broader buffer part enabling one to position a preform of sealing material in the buffer part for providing the sealing material.

In an embodiment of the invention, the support structure sidewall comprises a notch extending from the diaphragm upwards along the sidewall to at most a location near the alignment section. This feature prevents a flow of sealing material from the buffer part to the undercut part during the sealing process.

In an alternative embodiment, the device further comprises an annular positioning element, wherein the annular positioning element at an inner rim adjoins the fluid facing side of the diaphragm and at an outer rim adjoins an annular edge of the housing sidewall which annular edge, the annular positioning element is further configured to be at distance from the housing near the diaphragm. These features provides a construction in which the support structure is secured between the housing sidewall while the influence of changing forces in the housing on the diaphragm is reduced.

It should be noted that U.S. Pat. No. 5,186,055 discloses pressure sensing transducer of the type utilizing a diaphragm with strain sensitive elements. The diaphragm is bonded to an intermediate support member which in turn is bonded to a main support member which is joined to a support collar and hermetically sealed thereto with a sealing glass. The sealing glass and the support collar have a larger temperature coefficient of expansion than that of the main support member to produce a compressive type seal at high temperatures. This construction comprises several bonds which have to resist the fluid pressure, whereas according to the invention the bonding between support structure and diaphragm is compressed by the fluid pressure. Further more, the construction according to the invention provides a reduced build-in height and connecting components of the pressure sensing device.

It will be clear that the various aspects mentioned in this patent application may be combined and may each be considered separately for a divisional patent application. Other features and advantages of the invention will become apparent from the following detailed description, taken in conjunction with the accompanying drawing which illustrate, by way of example, various features of preferred embodiments of the invention.

BRIEF DESCRIPTION OF THE DRAWINGS

These and other aspects, properties and advantages and details of the invention will be explained hereinafter based on the following detailed description of exemplary embodiments with reference to the drawings, wherein like reference numerals denote like or comparable parts, and in which.

DETAILED DESCRIPTION OF EXEMPLARY EMBODIMENTS

Figure 1:
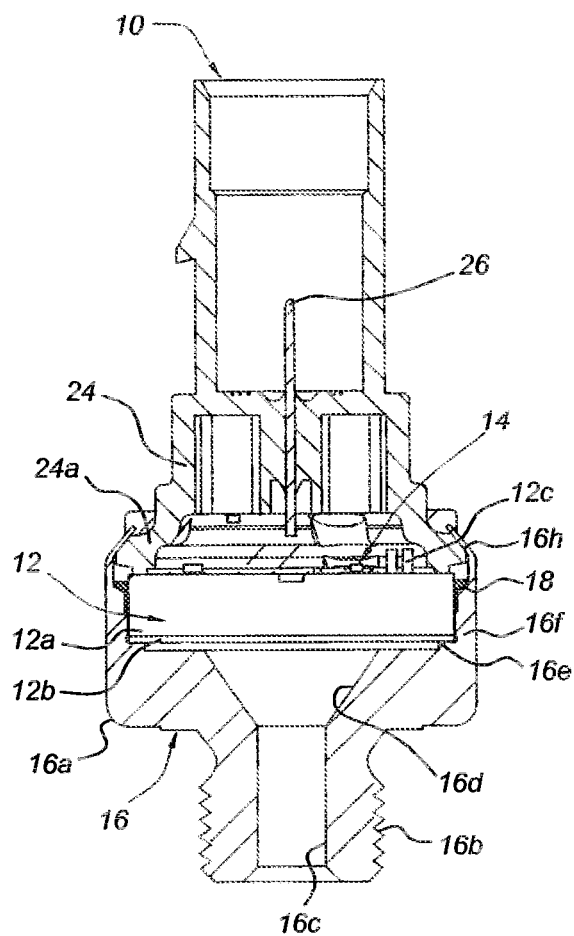
FIG. 1 is a cross sectional view of a first embodiment of the device according to the invention.

Referring to the drawings, numeral 10 in FIG. 1 indicates a first embodiment of an improved sensor device made in accordance with the invention which is shown to comprise a capacitive pressure sensing element or transducer 12 which includes a ceramic base or support structure 12*a* formed of alumina or the like and diaphragm 12*b* of like material which is mounted on the base in closely spaced, sealed overlying relation thereto. Thin metal coatings (not shown) are disposed on opposing inner surfaces of the base and diaphragm which serve as capacitor plates. Electrical leads., two of which, 12c, are indicated in the figure, extend from the coatings up through the base for attachment to conditioning electronics 14, to be discussed. Transducer 12 is received in a cavity formed in a hexport housing 16 formed of suitable material such as brass, stainless steel, aluminium, or ceramic material. Hexport housing 16 has a base portion 16a preferably formed with hexagonally disposed flat surfaces (not shown) to facilitate installation using threaded coupling portion 16b. A fluid receiving passageway 16c extends through coupling portion 16b to a recessed chamber 16d in a bottom wall formed with a circumferentially extending annular platform 16e.

Hexport housing 16 is formed with sidewall 16f which has a generally cylindrical inner surface and an outer surface formed by the hexagonally disposed flat surfaces. Housing side wall 16f is attenuated at 16h to facilitate crimping attachment to a connector housing 24. Connector housing 24 is formed of suitable electrically insulating material and has a base portion 24a formed with a recess disposed over the transducer and receives conventional conditioning electronics 14 noted above and as disclosed in U.S. Pat. No. 4,875,135, referenced supra. Connector housing 24 mounts sensing device terminals 26, one of which is shown, for attachment to conditioning electronics 14. The attenuated wall portion 16h is crimped over the outer peripheral portion of base 24a of the connector housing to complete assembly of the sensor device. The outer peripheral portion of ceramic diaphragm 12b of the sensing element is immovable relative to base 12a due to the presence of glass placed therebetween (not shown) to space the diaphragm from the base and seal the cavity between the two members. The immovable portion of the diaphragm is received on platform 16e with recessed chamber 16d aligned with the movable portion of the ceramic diaphragm.

A hermetic seal 18 is provided by a circumferential glass seal between the cylindrical inner side of sidewall and the support structure 12a. In this way, the transducer is immovable in the housing. The material of the hermetic seal is a glass, more preferably a low temperature sealing glass, more particular a glass with a glass transition temperature which is lower than the glass transition temperature of the glass placed between the support structure 12a and the diaphragm. The material of the hermetic seal 18 is preferably at least under radial pressure at height of the neutral bending plane of the pressure sensing transducer 12. The neutral bending plane corresponds to the position at the outer peripheral side of the transducer on which pressure forces may act without bending the support structure 12a and diaphragm 12b. As the support structure 12a provides the strength of the pressure sensing transducer 12, the neutral bending plane will be close to half the height of the support structure 12a. Radial in the context of the present invention means that the pressure forces have a main vector component with a direction which is essentially parallel to the plane of the diaphragm. An advantage of this construction wherein the diaphragm, i.e. pressure sensitive element, is between the support structure 12a and base portion 16a of the housing providing the recessed pressure chamber, is that the base portion 24a of the connector housing 24 could be positioned directly on the transducer 12 and attached to the housing 16 without causing stress in the diaphragm 12b. The hermetic seal eliminates a provision of a support plate as shown in U.S. Pat. No. 6,272,927 to allow crimping using a relative high force to withstand the fluid pressure to which the sensor will be exposed without concern that excessive force will be applied to the pressure sensitive part of the transducer by the crimping operation. By having the seal area designed such that the forces acting on the transducer from the seal material are essentially symmetrical around the neutral bending plane, i.e. the moment above the neutral bending plane is essentially equal to the moment below the neutral bending plane. The hermetic seal significantly reduces the force acting on the connector housing 14 due to the fluid pressure. The fluid pressure is transferred through the seal to sidewall 16f. Consequently, a relative low crimping force is sufficient to attach the connector housing 24 to the hexport housing 16 by means of crimping the attenuated wall portion 16h.

Figure 2:
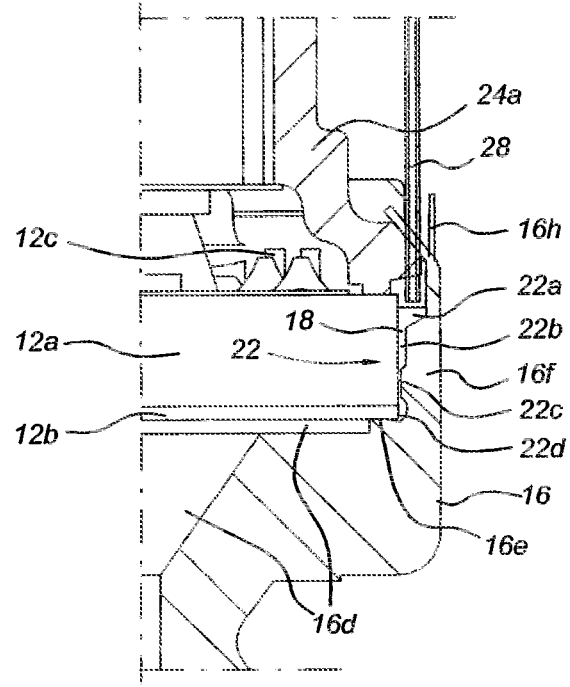
FIG. 2 is an enlarged view of the hermetic seal area of the embodiment shown in FIG. 1.

FIG. 2 shows an enlarged view of the hermetic seal area of the embodiment shown in FIG. 1. The hermetic seal area 22 is defined by the gap or space between the support structure 12b of the transducer 12 and the upper surface of the sidewall 16f. The seal area 22 comprises four zones or parts, a buffer part 22a a sealing part 22b, an alignment part 22c and an undercut part 22d. The buffer part or collection part 22a is configured for receiving seal material before sealing. The sealing part 22b is configured for providing the hermetical seal between the support structure 12b and the housing 16 The alignment part 22c is configured for positioning the transducer when received in the housing and preventing the seal material from flowing down. The undercut part 22d is configured to prevent seal material from flowing under the active area of the diaphragm, i.e. forming a rigid construction directly between the diaphragm 12b and the housing 16. Such a rigid construction would transfer torque forces or other changing forces in the housing directly to the diaphragm 12b comprising a pressure sensitive element, not shown, resulting in measuring errors. This effect is measurable in case the base 16a is too thin, i.e. not stiff enough). it should be noted that the diaphragm rests on the annular platform 16e. This is not a rigid coupling as the diaphragm can still move horizontally with respect to the annular platform 16e.

From FIG. 2 can be seen that the undercut part extends from being adjacent to the support structure 12a along the cylindrical side of the diaphragm up to below the fluid facing side of the diaphragms exposed to the fluid pressure. It should be noted that the active area of the diaphragm should not come in contact with any of the housing or sealing material. The active area is the area of the diaphragm that moves with respect to the support structure of the transducer when the pressure in the fluid changes. The inactive area corresponds generally to the part of the diaphragm that is bonded by a bonding material to the support structure. Preferably, the melt temperature of the sealing material to form the sealing is lower than the melt temperature of the bonding material to bond the diaphragm to the support structure.

The hermetic seal 18 can be made with the following process steps. A transducer 12 is received in a cavity formed in a hexport housing 16 and positioned on the annular platform 16e. By means of a dispense syringe 28, a glass paste or powder is dispensed into the buffer part 22a. Alternatively, a preform is placed into the buffer part by means of a pick and place machine. A preform could be in the form of a pre-pressed sintered glass ring/form. During heating the solvent in the glass paste evaporates. The glass will flow into the sealing part 22b due to capillary action and/or gravimetric orientation. The material of the housing 16 sealing material and support structure 12a have been chosen such that after cooling down a compressed seal is formed. Therefore, the coefficient of thermal expansion CTE of the housing is larger than the CTE of the support structure and the GTE of the sealing material. As sealing material any type of glass can be used, which can be in the form of a paste, preform or powder.

From FIG. 2 can further be seen that the sealing space 22 has a first width in the buffer part, a second width in the sealing part, a third width in the alignment part and a fourth width in the undercut part. The first width>the second width>the third width and the fourth width>the third width. The buffer part 22a should be wide enough to receive sufficient sealing material to provide a contiguous glass seal in the sealing part 22b. As during the heating of the sealing process organic material is glazed out of the sealing material, the buffer part 22a should be larger, i.e. than the sealing part 22b. More volume of sealing material is necessary than the volume of the sealing part 22b.

Figure 3:
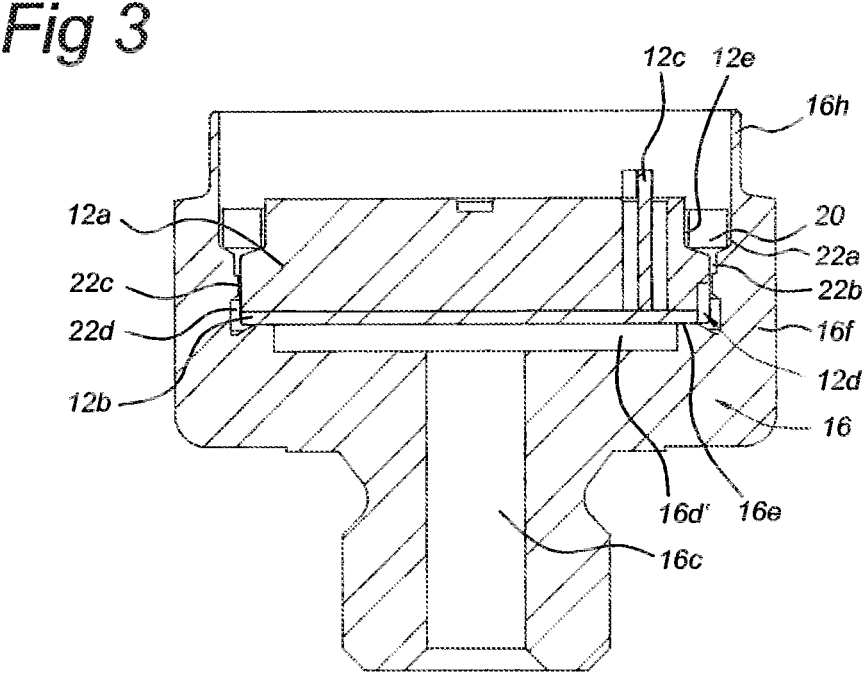
FIG. 3 is a cross sectional view of a second embodiment before the sealing process.
Figure 4:
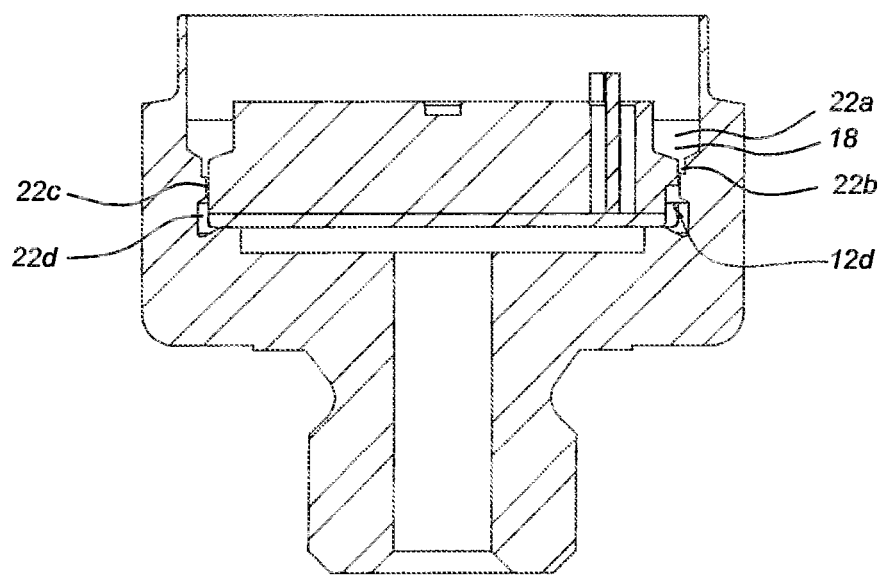
FIG. 4 is a cross sectional view of a second embodiment after the sealing process.

Instead of a glass paste a preformed ring of sealing material could be used. FIG. 3 is a cross sectional view of a second embodiment before the sealing process. In this embodiment the preformed ring is indicated by 20. The buffer past 22a is widened by annular recess 12e in the support stricture from a side opposite the side to which the diaphragm is attached. FIG. 4 is a cross sectional view of the second embodiment after the sealing process.

Figure 5:
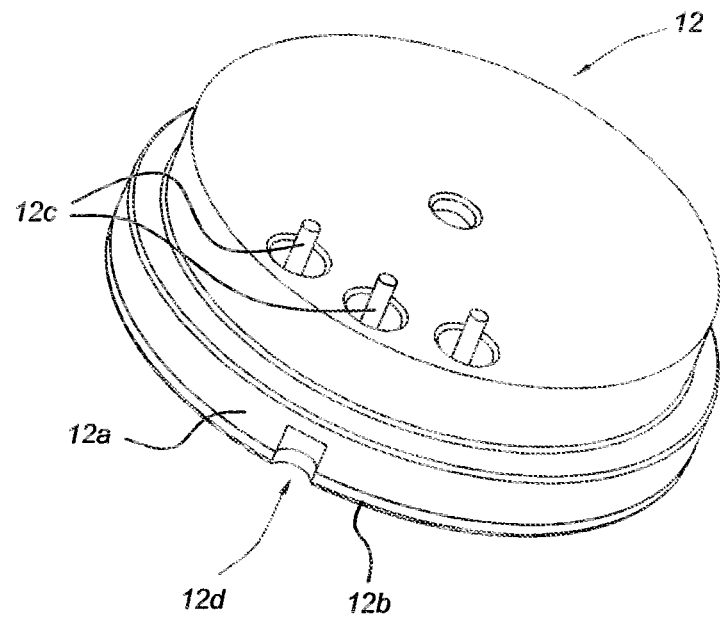
FIG. 5 is a perspective view of an embodiment of transducer suitable for use in the first and second embodiment.

A conventional pressure sensing element 12 comprises in the exterior circular surface a notch 12d extending from the upper side to the lower side of the element 12. The notch is used as a position indication and means during the manufacturing process of the ceramic pressure sensing element. During the sealing process, the sealing material will preferably flow through the opening of the notch, resulting in irregularities in the annular sealing in the sealing part 22b. In worst cases, all the sealing material located near the notch will flow through the notch, resulting in an opening in the seal. To avoid this, the ceramic pressure sensing element 12 comprises a notch in the exterior surface which extends from the lower side of the sensing element at which the diaphragm is located to half way the support structure 12a. Preferable, the notch extends from the diaphragm upwards along the sidewall to at most a location near the alignment part, i.e. the notch should not reach the sealing part 22b. FIG. 5 shows a perspective view of an embodiment of transducer 12 comprising a notch 12d extending from the diaphragm 12b upwards to half way the height of the support structure 12a.

Figure 6:
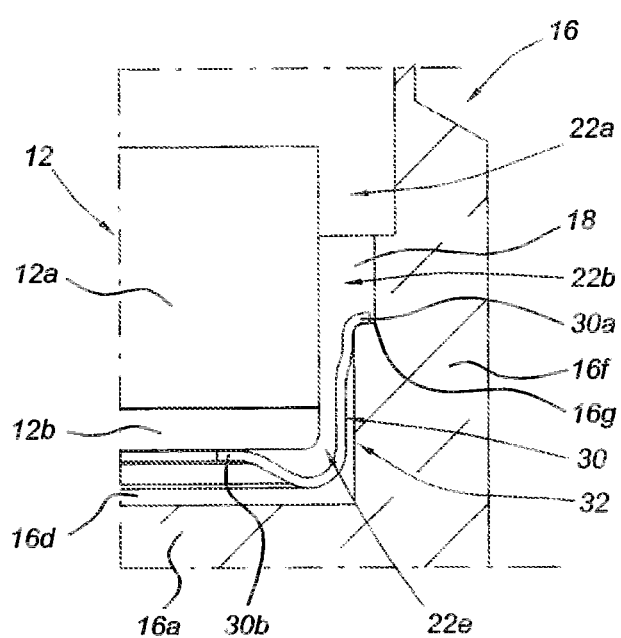
FIG. 6 is an enlarged view of the hermetic seal area of a third embodiment of the invention.

FIG. 6 shows an enlarged view of the hermetic seal area of a third embodiment of the invention. In this embodiment, the pressure sensing device further comprises an annular positioning element 30. The annular positioning element 30 is configured to receive the pressure sensing element 12. The annular positioning element 30 comprises an outer rim which adjoins an annular edge of the housing sidewall 16f. The annular positioning element 30 further comprises an inner rim which adjoins the fluid facing side of the diaphragm 12b after receiving the ceramic pressure sensing element. The annular positioning element is further configured to be at distance from the housing near or at the level of the diaphragm. Dimples (not shown) in the annular positioning element can be made to provide alignment of the pressure sensing element. The sealing space 22 is now defined by the space between the ceramic pressure sensing element 12 and the surface of the inner side of housing sidewall 16f and the annular positioning element 30. The sealing space 22 comprises in this embodiment three parts, the buffer part 22a, the sealing part 22b and a remaining part 22e. The buffer part 22a is configured to receive sealing material before the sealing process. The sealing part 22b is the area of the sealing which provides the hermetic sealing. The remaining part 22e extends from the sealing part to the inner rim 30b and is sufficient width to be homogeneously filled with sealing material during the sealing process and seals the bonding material between the diaphragm 12b and support structure 12a from the fluid. After the sealing process, the seal material in the sealing part 22b will be compressed. In the remaining part 22e, the sealing material could be less compressed due to the free space between the positioning element 30 and the sidewall 16f below the sealing part 22b than the seal material between the support structure 12a and the housing 16. Advantages of this embodiment are a simple construction of recess in the hexport housing 16 for receiving the transducer 12. Furthermore, a conventional transducer with notch along the height of the transducer can be used. Finally, the diaphragm is kept at distance from the hexport housing 16, which reduces significantly the transfer of stress in the hexport to the diaphragm.

Figure 7:
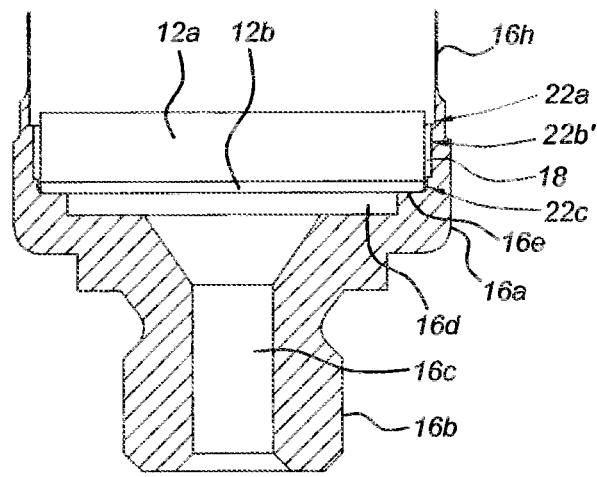
FIG. 7 is a cross sectional view of a third embodiment.

FIG. 7 shows a cross sectional view of a third embodiment of the invention. This is the most simple embodiment. In this embodiment, the sealing area comprises a buffer part 22a, sealing part 22b' and an alignment part 22c. The alignment part 22c is along the border of the diaphragm 12b. Furthermore, the alignment part 22c reaches the annular platform 16e. In this embodiment, the sealing material will flow into the alignment part along the diaphragm and forms a sealing for the bonding material (not shown) which bonds the diaphragm 12b to the support structure 12a. It should be noted that it might be possible that the width of the sealing part 22b' is equal to the width of the buffer part 22a.

Figure 8:
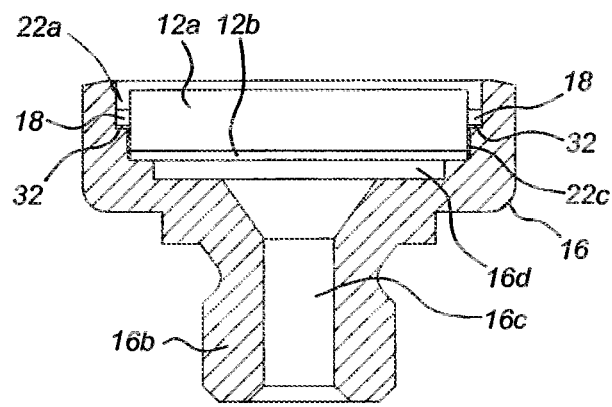
FIG. 8 is a cross sectional view of a fourth embodiment.

FIG. 8 is a cross sectional view of a fourth embodiment. In this embodiment a spacer 32 is used to position the transducer in the hexport housing 16. The spacer 32 is a thin ring of metal which is slid around the support structure 12a in such a way that it is clamped to the support structure 12a. Furthermore, the housing 16 comprises a support part on which the space 32 will be positioned when the transducer is received in the housing. The spacer will prevent that sealing material will pass the spacer 32 and flows into the alignment part 22c. Furthermore, the spacer allows one to have only sealing material under pressure around the neutral bending plane of the transducer. The space functions thus as an alignment structure to position the diaphragm such in the housing that its border does not touch the housing. In another embodiment, not shown, the diaphragm is at distance from the annular platform of the housing 16. In this embodiment, the diaphragm does not have any direct contact with the housing 16 and the fluid will reach the spacer 32.

Figure 9:
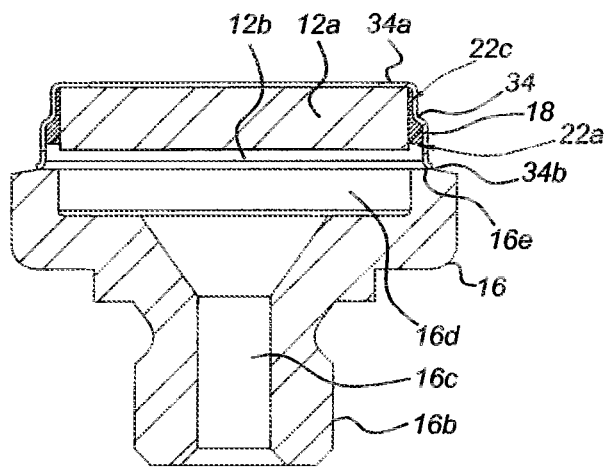
FIG. 9 is a cross sectional view of a fifth embodiment.

FIG. 9 is a cross sectional view of a fifth embodiment. In this embodiment, a glass sealing cup 34 is provided to form a support element 34 between the transducer 12 and the housing 16. The glass sealing cup 34 has an annular form and forms a cavity for receiving the transducer 12. The glass sealing cup 34 is from a material suitable for welding to the hexport housing 16. The space between the circular sidewall of the support structure 12a and the glass sealing cup 34 is used to install a hermetic seal of glass and to affix the transducer in the glass sealing cup 34. After affixing the transducer in the glass sealing cup 34, an outer rim 34b of the glass sealing cup 34 is welded to an annular platform 16e of the housing 16. An advantage of this embodiment is that the transducer is positioned at distance from the housing by means of the support element, which reduces the sensitivity with respect to torque forces in the housing. Furthermore, an inner rim 34 of the glass sealing cup 34 will resist the pressure forces and keeps the transducer in position in the housing whereas the sealing material will form a robust seal between the glass sealing cup 34 and transducer 12. In this embodiment, it is not necessary to have a high compression pressure in the sealing material. It might be clear that the sealing material may be present around the diaphragm as long as the sealing material does not touch the active area of the diaphragm.

Figure 10:
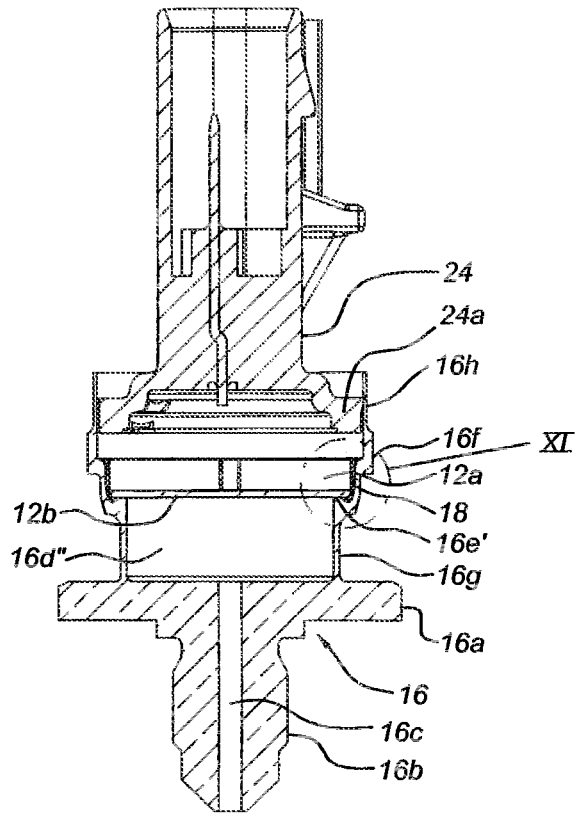
FIG. 10 is a cross sectional view of a sixth embodiment.

FIG. 10 is a cross sectional view of a sixth embodiment. In this embodiment the annular platform 16e' is placed at distance from the base portion of the housing comprising the hexagonally disposed flat surfaces 16a. The recessed chamber 16d" is enlarged by means of a recessed chamber sidewall 16g extending upwardly from the base portion 16a. The recessed chamber sidewall 16g reduces the sensitivity of the pressure sensor with respect to torque forces introduced in the base portion 16a when mounting the pressure sensor device.

Figure 11:
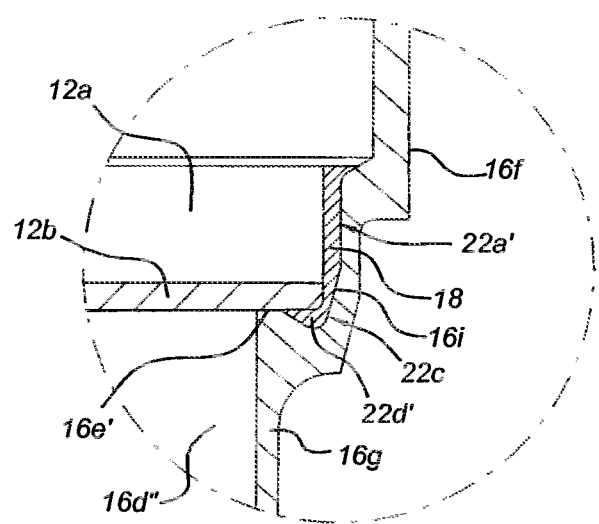
FIG. 11 is an enlarged view of the hermetic seal area of the sixth embodiment of the invention.

FIG. 11 shows an enlarged view of the hermetic seal area of the sixth embodiment of the invention. In this embodiment the housing 16 comprises an alignment surface which is angled with respect to the sidewall of the transducer 12. The alignment surface forms a conical surface between which the diaphragm 12b is positioned. The sealing area comprises a combined buffer and sealing part 22a' adjacent to the transducer 12 to provide a seal. The buffer and sealing part 22a' narrows in the direction of the diaphragm 12b, passes the alignment part 22c and continues as the undercut part 22d' of the sealing area. The very short narrow transition between buffer and sealing part 22a" and undercut part 22d' allows the sealing material, i.e. glass, to flow easily from the sealing part 22a" in to the undercut part 22d'. The annular platform 16e' on which the diaphragm is placed prevents the seal material to flow in to the recessed chamber 16d".

The thickness of the housing along the transducer 12a, 12b and distance between the housing and transducer forming the gap for the sealing material will determine the pressure in the sealing material and the farces acting on the sidewall of the transducer. The thicker the wail of the housing, the higher the pressure in the sealing material and consequently the pressure acting on the transducer. In FIG. 11 can be seen that the housing is thicker adjacent to the upper part of the transducer/support structure 12a. This will result in the highest pressure in the sealing material at the level of the neutral bending plane of the transducers. The neutral bending plane is somewhere in the middle of the height of the transducer.

In the embodiments given above, a capacitive pressure sensing element is used to illustrate the invention. However in stead of a capacitive pressure sensing element, strain gauges could be attached to the diaphragm and thus providing a piezoresistive pressure sensing element. The transducer could also be in the form of a piezoelectric pressure sensing element comprising a support structure and a diaphragm wherein the diaphragm is positioned in the sensor device between the support structure and the recessed chamber which comprises in use the fluid. Furthermore, the embodiments disclose a cylindrical capacitive pressure sensing element. The invention could also be applied to a hexport housing provided with a squared recess for receiving a squared pressure sensing element, The measures described hereinbefore for embodying the invention can obviously be carried out separately or in parallel or in a different combination or if appropriate be supplemented with further measures; it will in this case be desirable for the implementation to depend on the field of application of the device, it should be understood that although particular embodiments of the invention have been described by way of illustrating the invention, the invention includes all modifications and equivalents thereof falling within the scope of the appended claims.

The invention claimed is:

1. A fluid pressure sensing device comprising:
    a pressure sensing transducer having a support structure and a diaphragm attached to said support structure, the diaphragm having a fluid facing side to be exposed to a fluid pressure;
    a connector body having connector terminals therein;
    a housing for forming a chamber together with the connector body; and
    an electrical circuit disposed in the chamber electrically connected to the transducer and connector terminals for providing an electrical signal corresponding to the applied pressure at the diaphragm,
    the housing having a transducer receiving cavity defined by a bottom wall and a housing sidewall extending upwardly from the bottom wall, the bottom wall formed with a fluid pressure receiving recess, a fluid pressure port formed in the housing in communication with the recess,
    wherein, the diaphragm is positioned between the support structure and the fluid pressure receiving recess and a seal material around a support structure sidewall fixes the pressure sensing transducer in the housing and provides a hermetic seal.

2. A fluid pressure sensing device according to claim 1, wherein seal material around the support structure of the pressure sensing transducer is radially compressed.

3. A fluid pressure sensing device according to claim 2, wherein the pressure sensing transducer has a neutral deflection plane and the seal material is at least radial compressed at height of the neutral deflection plane.

4. A fluid pressure sensing device according to claim 1, wherein the seal material fixes the pressure sensing transducer directly to the housing.

5. A fluid pressure sensing device according to claim 4, wherein a seal space is present between the sidewall and the support structure, the seal space comprising a buffer part configured for receiving seal material before sealing, a sealing part configured for providing the hermetical sealing and an alignment part configured for aligning of the pressure sensing transducer in the housing.

6. A fluid pressure sensing device according to claims 4, wherein the diaphragm has a border side and the seal space further comprises an undercut part extending from the alignment part along the border side of the diaphragm to an annular platform of the housing on which the fluid facing side of the diaphragm is positioned.

7. A fluid pressure sensing device according to claim 5, wherein the seal space has a first width in the buffer part, as second width in the sealing part and a third width in the alignment part, the first width ≧ the second width > the third width.

8. A fluid pressure sensing device according to claim 7, wherein an annular recess of the support structure forms a part of the buffer part.

9. A fluid pressure sensing device according to claim 5, wherein the support structure sidewall comprises a notch extending from the diaphragm upwards along the sidewall to at most a location near the alignment part.

10. A fluid pressure sensing device according to claim 1, wherein the device further comprises an annular positioning element, wherein the annular positioning element at an inner rim adjoins the fluid facing side of the diaphragm and at an outer rim adjoins an annular edge of the housing sidewall which is further configured to be at a distance from the housing near the diaphragm.

11. A fluid pressure sensing device according to claim 1, wherein the device further comprises a spacer positioned around the support structure configured to position the pressure sensing transducer in the housing to prevent flowing of sealing material from a sealing space in the direction of the diaphragm.

12. A fluid pressure sensing device according to claim 1, wherein the device further comprises a support element hermetically attached to the housing by an annular weld, wherein the support structure of the pressure sensing transducer is at least partially received in the support element and the seal material forms an hermetic seal between the transducer and the support element.

13. A fluid pressure sensing device according to claim 1, wherein the support structure is a ceramic support structure.

14. A fluid pressure sensing device according to claim 1, wherein the pressure sensing transducer is a capacitive pressure sensing transducer.

15. A fluid pressure sensing device according to claim 1, wherein the sealing material is a glass, more preferably a low temperature sealing glass.

* * * * *